Figure 1:
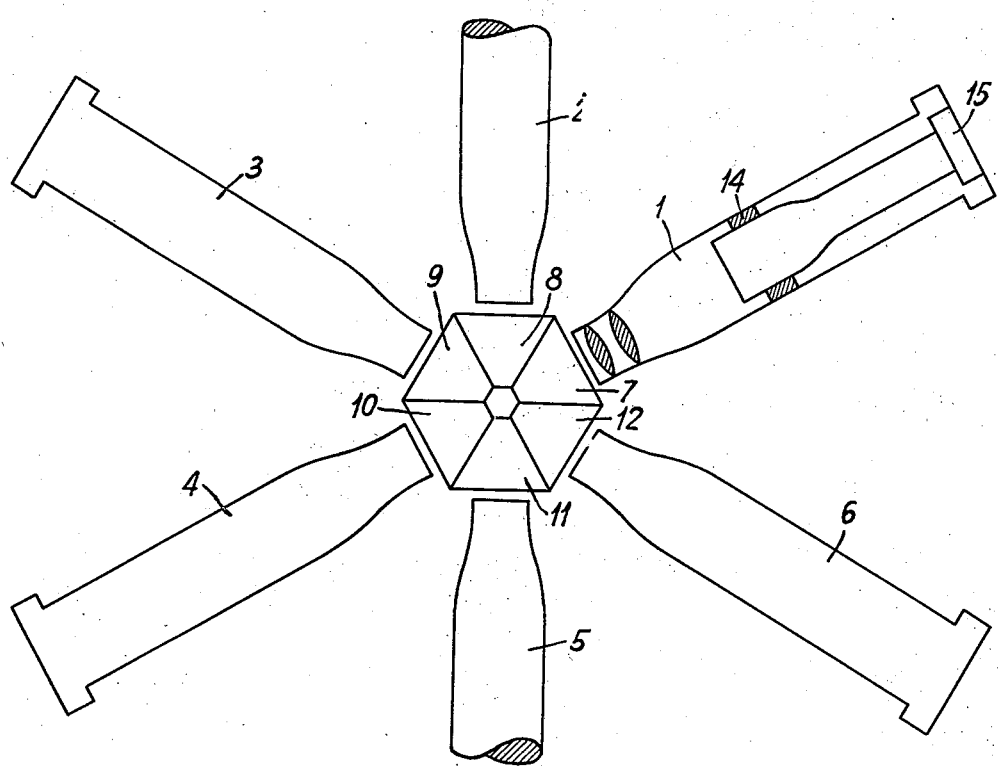

Dec. 30, 1941.                H. BÜCKNER                2,267,813
                  MULTICATHODE RAY ELECTRODE ASSEMBLY
                         Filed Oct. 24, 1939

INVENTOR
HANS BÜCKNER
BY
ATTORNEY

Patented Dec. 30, 1941

2,267,813

UNITED STATES PATENT OFFICE 2,267,813

MULTICATHODE RAY ELECTRODE ASSEMBLY

Hans Bückner, Berlin, Germany, assignor to General Electric Company, Schenectady, N. Y., a corporation of New York Application October 24, 1939, Serial No. 300,898
In Germany November 5, 1938

3 Claims. (Cl. 250—141)

It often becomes necessary and desirable to observe simultaneously several cathode ray oscillograms. This is the case, for instance, where two electrical performances are involved which closely depend on each other such as in the case of the alternating current and alternating potential in a circuit arrangement whereby the relative phase position of the performances is to be ascertained.

In the art of cathode ray oscillography, arrangements have become known which afford the simultaneous viewing of several oscillograms. Thus, multiple ray oscillographs have been developed in which all oscillograms are projected on the fluorescent screen of a single Braun tube where they can be compared. However, such tubes are rather complicated and expensive. Moreover, attempts have not always been successful in adjusting the systems inside a tube in such a manner that both deflecting systems have the same sensitivity.

For the simultaneous viewing of the oscillograms of two Braun tubes, it is also known to arrange both tubes at right angles each to the other and to place between the screens thereof a slightly silvered partially transparent glass plate such that the latter has an inclination of 45° to either of the screens. During observation, the one screen is seen indirectly through the glass plate and the other one is seen by its mirror image.

It has also been suggested to combine two of the arrangements just described with a stereoscope such that the fluorescent screen images of four Braun tubes can be viewed simultaneously through the stereoscope.

As seen from the above, there exists a real demand in the art for arrangements by means of which the screens of several Braun tubes can be viewed simultaneously. Yet the enumerated arrangements are far from satisfying the requirements demanded of them. For instance, it is desirable to view simultaneously five, six, or more Braun tubes, whereas with the arrangements cited above only three, and at the most four screens of Braun tubes can be observed at the same time.

The invention solves the problem of providing an arrangement for more than two Braun tubes, and for instance for six Braun tubes, with which the fluorescent screen images of all tubes can be viewed at the same place on a common screen such as, for instance, on a frosted disk and in a manner such that the various images are not in a twisted position.

The subject-matter of the invention in general is an arrangement, more especially an electron ray oscillograph having more than two Braun tubes and in which the fluorescent screen images of all Braun tubes are rendered visible at the same place on a common projection screen, for instance on a frosted disk with the use of a respective projection system consisting of lenses and arranged in front of each tube and with the use of mirrors whereby the Braun tubes are arranged in the form of a star about a ring of mirrors, and each mirror projects on the same place of the projection screen the fluorescent screen image of a Braun tube assigned to the respective mirror and arranged in front thereof and that the Braun tubes are so turned about their axes that the fluorescent screen images of the said tubes which are visible on the projection screen are not twisted relative each other.

Figure 2:
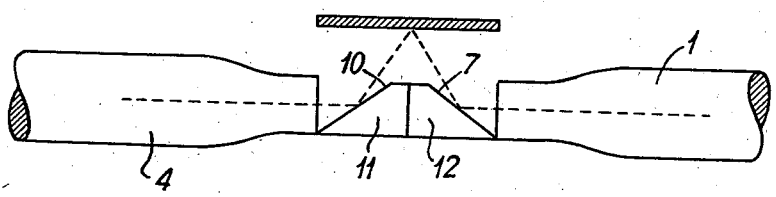

The invention will now be described in greater detail on hand of the arrangements shown in the figures by way of example in which Fig. 1 is a top view of one embodiment thereof, and Fig. 2 is a view taken along a transverse cutting plane of part of Fig. 1.

Fig. 1 shows an arrangement of six Braun tubes which are mounted in their sockets and are designated by 1—6. The projection screen (not shown) is assumed to extend parallel to the drawing plane. In accordance with the invention, six mirrors 7—12 are disposed in a circle and form a frustum of a pyramid, or to be more exact, the area of such frustum. The frustum of the pyramid points at its smaller base towards the projection screen. Each mirror has placed in front thereof a Braun tube whereby each mirror throws upon the projection screen the fluorescent screen image of the Braun tube assigned to the respective mirror. The mirror arrangement may also have the form of a pyramid; the mirrors may also be separately arranged in a circle, for instance, such that the planes thereof pass through a point.

Fig. 2 shows the position of the frustum of the pyramid with regard to the projection screen 16. As already stated, the frustum of the pyramid whose mirrors 7, 10, 11 and 12 are indicated, points with its reduced part towards the screen 16. The Braun tube 1 is placed in front of the mirror 7 and the Braun tube 4 is in front of the mirror 10 so that both Braun tubes are arranged parallel to the projection screen. Care is taken to provide an inclination of the mirrors of the frustum of the pyramid with respect to the projection screen which is not exactly 45° but such that the axes of all Braun tubes hence, especially also the axes of the tubes 1 and 4 meet after reflection at the mirrors in approximately one and the same point of the projection screen such as is indicated in dash lines for the axes of the tubes 1 and 4.

In order to assure that the images of the individual Braun tubes as they appear on the projection screen 16 will not be twisted relative each other, that is, that they are not turned with respect to one another, the Braun tubes are brought into proper position by turning them about their axes. This will be readily understood from the following consideration. When assuming that all Braun tubes are provided with pairs of deviation plates which deviate the electron ray of each tube in coordinates at right angle to one another and when, supposing that an observer standing at right angles to the drawing plane views on each individual fluorescent screen of the Braun tube an oscillogram whose coordinates corresponding to the directions of deflection are horizontal and vertical, then on the projection screen the individual oscillograms are turned relative one another such that the coordinates thereof no longer have the same direction. For instance, if the frustum of the pyramid had a regular form, the oscillograms of the tubes 1 and 2 would have an angle of 60° between each other. What should be avoided however is that all oscillograms reproduced on the projection screen will not be turned to one another in order that they can be compared with each other. This can be accomplished in that some of the Braun tubes are turned about their axes. This also causes a turning of the respective oscillogram on the projection screen and if, for instance, the tubes 2, 3, 4, 5 and 6 are turned at certain angles, it can be achieved that none of the oscillograms will be in a turned position relative to the oscillogram of tube 1.

As can be seen, an arrangement according to the invention may also be arranged for more than six Braun tubes. To this end, it is necessary only to provide one pyramid or one frustum of a pyramid consisting of a number of mirrors equal to the number of tubes present. Thus in accordance with the invention, a large number of Braun tubes can be arranged in such a manner that the fluorescent screen images thereof are rendered visible at one and the same place on a projection screen such that the fluorescent screen images are not turned relative each other. Obviously, the reference to a pyramidal form is meant to be simply an example of the manner in which the mirrors can be arranged in a circular fashion. An arrangement, for instance, of the mirrors 7—12 could also be chosen in which the various mirrors are not in touch with one another. This would offer the possibility of adjusting each mirror individually, i. e. to adjust for instance in the desired manner the inclination of the mirror with respect to the projection screen.

It is also desirable to arrange the Braun tube in an adjustable manner such that they can be displaced parallel to each other in the direction of the normal of the projection screen. In this way, a parallel displacement of the corresponding fluorescent screen images on the projection screen can be carried out such as can be of advantage to the comparison of the fluorescent screen images.

As already pointed out, the Braun tubes proper are mounted in sockets. Figure 1 shows this mounting in detail for the tube 1. The actual Braun tube is herein designated by 13. It is mounted in its socket in a springy fashion, namely, by means of a ring 14 composed of elastic material. The socket of the tube is designated by 15. It has the same diameter as the diameter of the bulb of the tube. The entire tube can be moved out of the socket towards the rear through an opening situated in back of the socket and eventually exchanged with another tube. The socket 1 is widened out at the place where the tube base is situated for the insertion of the electric leads for the tube at the said place. The socket has inserted therein in front of the Braun tube a lens system 17 serving for projecting on the projection screen by means of the mirror 7 the fluorescent screen of the tube.

What I claim is:

1. An electro-optical image reproducing system comprising a plurality of individual cathode ray tubes, means for reproducing at least a portion of a pattern on the screen means of at least part of said tubes, and reflecting means having the surfaces thereof forming at least a portion of a frustrated section of a geometrical figure which is at least partially closed, the cathode ray tubes being grouped about said reflecting surfaces whereby all of said surfaces reflect patterns from the screen of said tubes onto a common plane of observation.

2. Apparatus in accordance with claim 1, wherein said frustrated section of a geometrical figure comprises a frustro-pyramidal section.

3. Apparatus in accordance with claim 1, wherein there is provided in addition means for holding said cathode ray tubes, said tubes being rotatably adjustable with respect to said holding means whereby the pattern formed on the screen thereof may be adjusted on the plane of observation.

HANS BÜCKNER.